United States Patent
Kisselbach et al.

(10) Patent No.: US 9,604,290 B2
(45) Date of Patent: Mar. 28, 2017

(54) MILLING TOOL AND CUTTING ELEMENT FOR A MILLING TOOL

(75) Inventors: Andreas Kisselbach, Aalen (DE);
Jurgen Graef, Oberkochen (DE);
Heiko Ehrensperger, Essingen (DE)

(73) Assignee: LEITZ GMBH & CO. KG, Oberkochen (DE)

( * ) Notice: Subject to any disclaimer, the term of this patent is extended or adjusted under 35 U.S.C. 154(b) by 1285 days.

(21) Appl. No.: 13/145,625

(22) PCT Filed: Jan. 6, 2010

(86) PCT No.: PCT/DE2010/000004
§ 371 (c)(1),
(2), (4) Date: Sep. 2, 2011

(87) PCT Pub. No.: WO2010/083799
PCT Pub. Date: Jul. 29, 2010

(65) Prior Publication Data
US 2011/0305533 A1 Dec. 15, 2011

(30) Foreign Application Priority Data
Jan. 21, 2009 (DE) .................. 10 2009 005 634

(51) Int. Cl.
*B27G 13/00* (2006.01)
*B23C 5/20* (2006.01)
(Continued)

(52) U.S. Cl.
CPC .............. *B23C 5/04* (2013.01); *B23C 5/2221* (2013.01); *B27G 13/04* (2013.01);
(Continued)

(58) Field of Classification Search
CPC ...... B23C 2200/0416; B23C 2200/165; B23C 2210/168; B23C 5/04; B23C 5/2221; B27G 13/00
(Continued)

(56) References Cited

U.S. PATENT DOCUMENTS 1,629,667 A * 5/1927 Knipple .................... 407/103
3,629,919 A * 12/1971 Trevarrow, Jr. ........... 407/103
(Continued)

FOREIGN PATENT DOCUMENTS

| CN | 1053903 A | 8/1991 |
|----|-----------|--------|
| CN | 1102146 A | 5/1995 |

(Continued)

OTHER PUBLICATIONS

Excerpt of magazine "HOB May 2008, p. 72".
(Continued)

*Primary Examiner* — Sara Addisu
(74) *Attorney, Agent, or Firm* — Andrew M. Calderon; Roberts Mlotkowski Safran Cole & Calderon, P.C.

(57) ABSTRACT

A milling tool for working non-metal materials, in particular wood, engineered wood, and plastic, includes a carrier body, a plurality of cutting elements, which can be inserted into said body on the periphery in a corresponding number of openings extending in the radial direction and can be screwed to the carrier body by way of a bore and which have a plate-shaped and in the cross-section a substantially tri-angular-shaped design and on a side edge are provided with a blade. The cutting element includes: the region located opposite of the blade is rounded, a groove extending substantially at a right angle to the blade is provided in the bottom, the bore divides the groove preferably into two regions. The opening includes: a web, which extends radially upward from the bottom of the opening serving as a (Continued)

support surface for the cutting element and which corresponds with the groove, a radial threaded bore, which preferably divides the web into two regions, and the cutting element has contact with the opening only with the bottom thereof, a side wall of the groove and part of the region located opposite of the blade.

21 Claims, 4 Drawing Sheets

(51) Int. Cl.
  *B23C 5/04* (2006.01)
  *B23C 5/22* (2006.01)
  *B27G 13/04* (2006.01)
(52) U.S. Cl.
  CPC  *B23C 2200/0416* (2013.01); *B23C 2200/165* (2013.01); *B23C 2210/168* (2013.01); *B23C 2226/315* (2013.01); *Y10T 407/1936* (2015.01); *Y10T 407/27* (2015.01)
(58) Field of Classification Search
  USPC ............... 407/40, 42, 48, 63, 113, 101–104; 144/117.1, 221, 218
  See application file for complete search history.

(56) References Cited

U.S. PATENT DOCUMENTS

| | | | | |
|---|---|---|---|---|
| 3,829,943 | A * | 8/1974 | Bartoszevicz et al. | 407/71 |
| 4,667,713 | A * | 5/1987 | Wright | 144/231 |
| 4,906,145 | A * | 3/1990 | Oliver | 407/43 |
| 5,002,104 | A * | 3/1991 | Stewart | 144/230 |
| 5,004,378 | A * | 4/1991 | Arai et al. | 407/106 |
| 5,542,795 | A * | 8/1996 | Mitchell | 407/35 |
| 5,603,365 | A | 2/1997 | Stewart | |
| 5,738,156 | A | 4/1998 | Stewart | |
| 5,924,826 | A * | 7/1999 | Bystrom et al. | 407/103 |
| 6,575,670 | B2 * | 6/2003 | Men | 407/42 |
| 6,659,694 | B1 * | 12/2003 | Asbell et al. | 407/40 |
| 7,217,070 | B2 * | 5/2007 | Hecht | 408/154 |
| 7,261,498 | B2 * | 8/2007 | Hecht et al. | 408/154 |
| 7,325,471 | B2 * | 2/2008 | Massa et al. | 82/1.11 |
| 7,537,419 | B2 * | 5/2009 | Sjoberg et al. | 407/103 |
| 2006/0120812 | A1 | 6/2006 | Hecht et al. | |
| 2006/0239786 | A1 | 10/2006 | Hecht et al. | |
| 2007/0127992 | A1 | 6/2007 | Spichtinger et al. | |

FOREIGN PATENT DOCUMENTS

| | | | |
|---|---|---|---|
| CN | 2429286 Y | | 5/2001 |
| CN | 1929945 A | | 3/2007 |
| CN | 101068645 A | | 11/2007 |
| CN | 101237954 A | | 8/2008 |
| DE | 4423861 | | 12/1994 |
| EP | 0688638 | | 12/1995 |
| EP | 0861144 | | 9/1998 |
| GB | 2057940 | | 9/1980 |
| JP | 03228512 A | * | 10/1991 |
| JP | 2556393 B2 | | 11/1996 |
| WO | WO9718068 | | 5/1997 |
| WO | WO2006061817 | | 6/2006 |

OTHER PUBLICATIONS

Written Opinion of the International Searching Authority for PCT/DE2010/000004, Jul. 26, 2011.
SIPO Search Report for Appl. No. 2010800048829, 2 pages.

* cited by examiner

MILLING TOOL AND CUTTING ELEMENT FOR A MILLING TOOL

FIELD OF THE INVENTION

The invention relates to a routing tool for machining nonmetallic materials, in particular wood, wood-based material and plastic, comprising a supporting body and a plurality of cutting elements which can be inserted therein circumferentially into a corresponding number of radially extending recesses and can be screwed to the supporting body via a hole and which are of plate-like design and of substantially triangular design in cross section and are provided with a blade at a side edge.

DISCUSSION OF BACKGROUND INFORMATION

The invention also relates to a cutting element for a routing tool.

Such a routing tool and a cutting element which can be used therewith is known, for example, from EP 0 861 144 B1 or U.S. Pat. No. 6,659,694 B1.

In the known tools, individual cutting elements are fastened in a recess tangentially to the lateral surface of the supporting body by a central screw, said recess being embodied in such a way that the cutting element bears with its outer edges (circumferential wall) against three locations in the recess and is supported against the applied cutting forces. The individual cutting elements are arranged in such a way that they form a continuous cutting helix in the tool supporting body.

In order to be able to fasten the edge blades at a shear cut angle relative to the tool center plane, the supporting body must be formed beyond the blade region of the cutting element so that there is sufficient construction space for the recess for accommodating the edge cutting element. Because the cutting elements are to be positioned in their associated recesses in such a way that they are supported against applied cutting forces, the supporting body must consequently enclose the edge cutting elements, that is to say it must extend beyond the cutting element. In order to achieve high true-running accuracy and exact alignment of the adjacent cutting elements in a continuous helix, the outer edges of the cutting elements (bearing surfaces) must be ground in a highly precise manner or the cutting edges in their entirety must be ground continuously in the fitted state of the cutting elements in the supporting body.

Disclosed in the journal "HOB 05/2008, page 72" is a routing tool having a light alloy supporting body in which the cutting elements are likewise screwed in a substantially radial direction via a central hole. Here, too, the cutting elements are positioned in a recess which orients the cutting element laterally at an outer edge. The routing tool has cutting elements with shear cut angles which produce a shearing cut toward the tool center plane. In order to be able to position the cutting elements as close to the edge of the supporting body as possible, the cutting elements are not of symmetrical construction, but rather a distinction is made between "right-hand" and "left-hand" cutting elements. The supporting body encloses the edge cutting elements on the outer side. The tool width is thus substantially greater than the actual cutting width which can be realized with the tool. The cutting elements are supported against the cutting forces solely by frictional forces of the screw preloading. In the region of the blades, the supporting body has no chip spaces for receiving the cut material. So that the individual blades are not reflected as marks on the workpiece, the cutting edges must be finish-ground in the fitted state.

It has proved to be advantageous for the tool supporting body of such routing tools to be, if possible, of cylindrical design, in order to achieve a low-noise configuration, and in addition to allow the blades to project only slightly beyond the lateral surface of the supporting body and to provide narrow chip spaces for receiving the cut material during the cutting operation. Such noise-reduced tools, at the same blade pitch circle diameter, are heavier than conventional routing tools on account of the greater use of material and can be reground less frequently on account of the small blade projection. In particular in smaller machines of light construction, the large mass of the tool has an adverse effect on the machining quality and on the tool life, which can be attributed to the vibration behavior.

EP 0 688 638 B1 discloses a routing tool having cutting elements which are specifically designed in such a way that they project laterally beyond the router body, thereby enabling rebates and grooves to be machined. The cutting elements are positioned laterally via the inner contour of a channel which is arranged in the seating surface in the cutting element and which is in elastic contact with the lateral surface of a heavy spring pin. Because the cutting element bears against both groove flanks of the trapezoidal groove running continuously over the entire blade height and against the rear surface thereof, the system per se is overdetermined, which is to be compensated for by the heavy spring pin. However, the positioning accuracy suffers due to this configuration, which leads to poor repeatability of the positioning of the blades when fitted repeatedly.

SUMMARY OF THE INVENTION

Proceeding from this statement of the problem, the routing tool described at the beginning is to be improved in such a way that, at a predetermined pitch circle diameter of the blade, the noise is reduced and the weight is reduced and the construction space which is only available to a limited extent in the machine tool is optimally utilized.

To solve this problem, a routing tool of the generic type is characterized by the following features:
a) the region opposite the blade is rounded,
b) a groove incorporated in the underside and running substantially at right angles to the blade,
c) the hole divides the groove preferably into two regions,
and by the following features of the recess:
d) a web which extends radially upward from the base thereof, serving as seating surface for the cutting element, and corresponds to the groove,
e) a radial tapped hole which preferably separates the web into two regions,
and is characterized in that
f) the cutting element is in contact with the recess only with the underside thereof, a side wall of the groove and part of the region thereof opposite the blade.

As a result of this configuration, the cutting elements are laterally positioned not via the outer contour but rather via a central groove. It is thereby possible for the cutting elements to terminate laterally flush with the supporting body or for them to project beyond it, irrespective of their shear cut angle.

The cutting element preferably has, at its circumferential wall, only one region in contact with the circumferential wall of the recess. Alternatively, the cutting element preferably has, at its circumferential wall, two regions in contact with the circumferential wall of the recess.

If the cutting element is designed in mirror symmetry with respect to the longitudinal axis of the groove, not only the production thereof but also the fitting in the supporting body are simplified.

The groove preferably extends over the full length of the underside of the cutting element.

In order to simplify the positioning accuracy, the contact of the cutting element with the recess at the region thereof opposite the blade can preferably be linear. To this end, it is advantageous if the wall of the recess in the contact region is designed to be plane (straight or flat). Defined line contact is thereby set by the connection to the rounded portion of the cutting element. The positioning of the cutting element perpendicularly with respect to the cutting edge is effected via this line contact. No contact with the circumferential wall of the cutting element is provided in the remaining region. The cutting element is positioned laterally via a side wall of the web in the recess. The groove in the cutting element and the web in the recess of the supporting body are embodied with slight clearance within the range of a few hundredths of a millimeter.

The supporting body is preferably made of light alloy, in particular preferably of aluminum.

If the tapped hole in the recess is arranged slightly eccentrically, the cutting element is automatically pressed against the rear bearing point and against one of the web sides when the central fastening screw is tightened.

The eccentricity of the tapped hole is then preferably within a range of between 0.02 and 0.2 mm.

At least the blades in the edge region of the supporting body are inserted into the supporting body at a shear cut angle for producing pressure forces on a workpiece. Depending on the shear cut angle of the blade, the bearing surface on the side of the web is always selected in such a way that the cutting element is always supported against the applied cutting forces. There is therefore only one cutting element, irrespective of the type of shear cut angles for which it is provided. Due to the central lateral positioning by means of groove and web, the recess in the supporting body can be laterally open and the cutting element can be fitted in a flush or projecting manner relative to the supporting body, irrespective of the direction in which the shear cut angle is provided.

The plurality of cutting elements is preferably arranged in such a way that, during a rotation of the supporting body, they produce a convex envelope curve from which a (slightly) concave surface in the machined workpiece results, and one chip space each is in particular preferably provided in front of each cutting element as viewed in the direction of rotation, and a cutting element suitable for use in this routing tool is in particular preferably provided.

A cutting element for a routing tool for machining non-metallic materials, comprising a plate-like parent body symmetrical to a line of symmetry, a blade provided on the parent body, and a fastening hole is characterized by the fact that, for solving the problem
a) the region opposite the blade is rounded,
b) a groove running substantially at right angles to the blade is incorporated into the underside,
c) the longitudinal axis of the groove coincides with the line of symmetry,
d) the blade is at a distance from the underside.

The groove is preferably divided into two regions by the fastening hole. If the groove extends over the full length of the underside, the production and in particular also the fitting of the cutting element in the routing tool is simplified.

The parent body is preferably made of a sintered material, for example carbide. The blade can be formed in one piece with the parent body and be made of the same material as the parent body. However, the blade is preferably made of a harder material than the parent body, in particular preferably of a polycrystalline diamond. In this case, the blade is then integrally connected to the parent body, for example by brazing or adhesive bonding.

In order to ensure that the blade is regrindable, said blade projects beyond the top side of the parent body.

In order to reduce the production costs, preferably only the underside of the parent body is ground in order to form a plane seating of the cutting element in the recess of the supporting body of the routing tool.

The fastening hole is preferably designed with a conical countersink, which in particular can be convexly curved.

The rounded portion, opposite the blade, of the cutting element preferably has a constant radius. The radius is preferably arranged concentrically to the fastening hole.

The cutting edge of the blade can be convexly curved and the radius of curvature decreases at the opposite edge regions.

BRIEF DESCRIPTION OF THE DRAWINGS

Exemplary embodiments of the invention are to be explained in more detail below with the aid of the drawing, in which.

DETAILED DESCRIPTION OF THE PRESENT INVENTION

Figure 1:
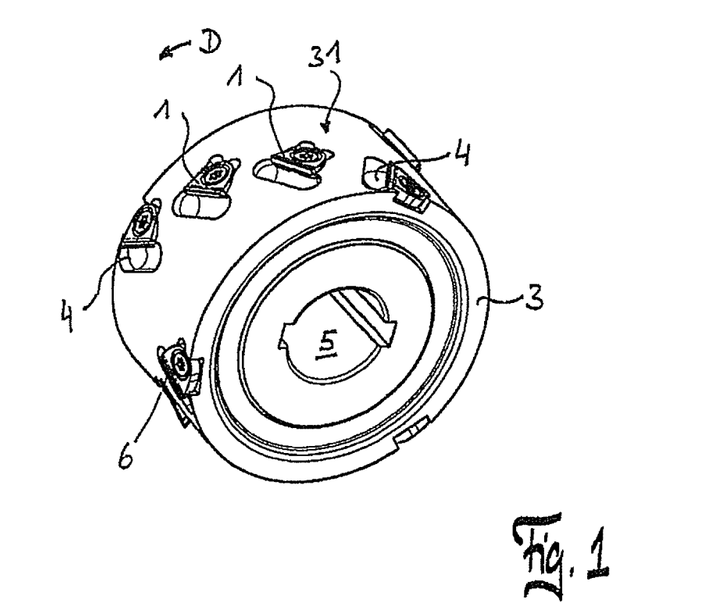
FIG. 1 shows the perspective illustration of a routing tool according to the invention.
Figure 2:
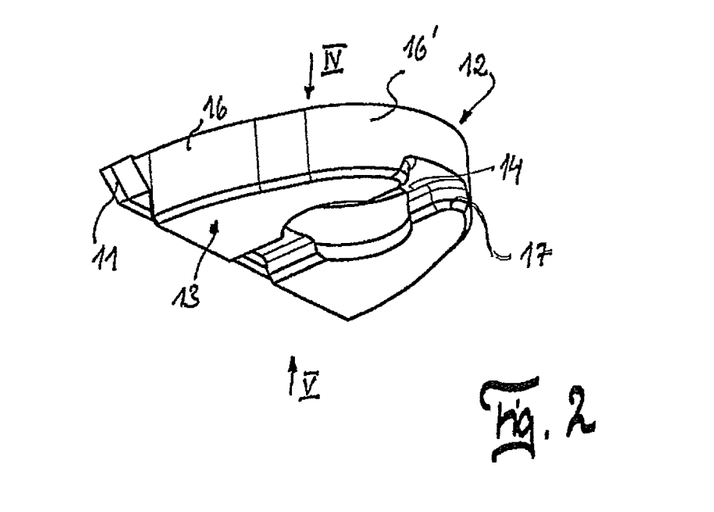
FIG. 2 shows the perspective illustration of a cutting element according to the invention.

The routing tool consists of a supporting body 3 with the cutting elements 1, which are inserted therein in recesses 2 and are screwed to the supporting body 3 via countersink screws 6. In front of each cutting element 1 is a chip space 4 for receiving the chips produced during the machining of workpieces. It can be seen from FIG. 1 that the outer cutting elements 1 are arranged in axially open recesses 2 and are not guided on their axially outer circumferential wall. The cutting elements 1 are arranged in such a way that a complete helical blade configuration is formed from the individual blades 11. The routing tool can be connected to a drive shaft (not shown here in any more detail) of a machine tool via the axial bore 5 provided in the supporting body 3.

Figures 3, 4:
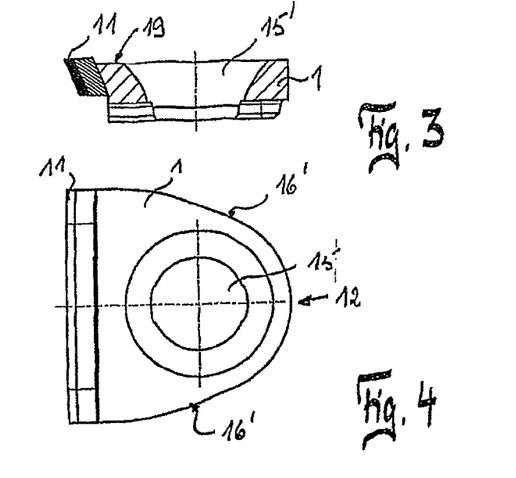
FIG. 3 shows a section along the line of symmetry of the cutting element according to FIG. 2.
FIG. 4 shows the view of the cutting element according to viewing arrow IV according to FIG. 2.
Figure 5:
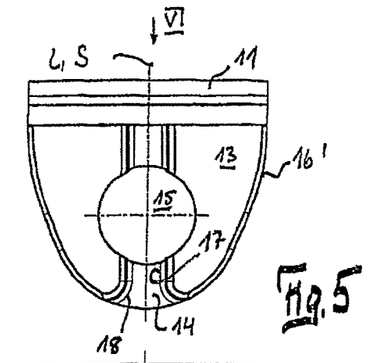
FIG. 5 shows the view of the cutting element according to viewing arrow V according to FIG. 2.
Figure 6:
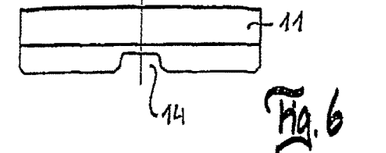
FIG. 6 shows the view of the cutting element according to viewing arrow VI according to FIG. 5.

Each cutting element 1 has a symmetrical shape which tapers toward the side opposite the blade 11 (cutting edge) and is substantially triangular. The region 12 opposite the blade 11 is designed to be rounded with a constant radius and is arranged concentrically to the fastening bore. Provided centrally is a countersunk hole 15 having a conical profile cross section in the region of the countersinking (cf. FIGS. 3, 4). The conical region 15' can be convexly designed in order to produce defined line contact with the conical head 61 of a countersunk screw 6 corresponding to the hole 15.

Figure 7:
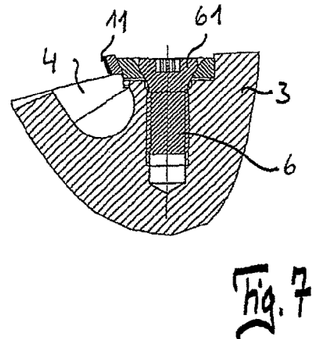
FIG. 7 shows a partial section through a routing tool according to the invention.

As FIG. 7 shows, the blade 11 ends at the same radial height as the lateral surface 31 of the supporting body 3. However, provision can also be made for the top side 19 of the cutting element 1 to terminate flush with the lateral surface 31 of the supporting body 3.

The hole 15 incorporated centrally in the cutting element of mirror-image configuration divides the groove 14 into two regions. Provided in the supporting body 3 is a recess 2 which corresponds substantially to the shape of the cutting element 1 and which has at least one web 22 (cf. FIG. 13) in the center of its base 21 serving as seating surface. In addition, a tapped hole 23, into which the countersunk screw 6 can be screwed, is provided in the base 21. As FIG. 12 shows, two webs 22 can also be provided, said webs 22 being separated from one another by the tapped hole 23. With its underside 13, the cutting element 1 rests in a planar manner on the base 21 of the recess 2. At its circumferential wall 16', the cutting element 1 is in contact with the wall 25 of the recess 2 only at the rounded portion 12 opposite the cutting edge 11. In this region, the wall 25 of the recess 2 is designed to be flat, as a result of which defined line contact is produced in combination with the rounded portion of the cutting element 1. The cutting element 1 is positioned perpendicularly with respect to the cutting edge 11 via this line contact. There is no contact with the cutting element 1 in the remaining region of the wall 25. On the contrary, a gap is provided. The cutting element 1 is positioned laterally via a side wall of the web 22. The groove 14 in the cutting element 1 and the web 22 in the recess 2 of the supporting body 3 are designed to correspond to one another with slight clearance within the range of a few hundredths of a millimeter. The tapped hole 23 in the recess 2 is not arranged exactly centrally, but rather is offset in such a way that the cutting element 1 is automatically pressed against the rear bearing point (wall 25) and against one of the sides of the web 22 when the central countersunk screw 6 is tightened. The center offset of the tapped hole 23 is within the range of 0.02 to 0.2 millimeters. Depending on the shear cut angle of the blade 11, the bearing surface on the side of the web 22 is always selected in such a way that the cutting element 1 is always supported against the applied cutting forces during the machining. That is to say there is only one cutting element 1 irrespective of the type of shear cut angle. Due to the central lateral positioning by means of groove 14 and web 22, the recess 2 in the supporting body can be axially open (cf. FIGS. 10 to 13 in conjunction with FIG. 1), such that the cutting element 1 can be fitted in a flush or projecting manner relative to the supporting body 3, irrespective of the direction in which the shear cut angle is provided.

The groove 14 and the web 22 are divided into two regions by the holes 15 and 23, and therefore the lateral positioning is effected not over the entire length of the cutting element 1 but rather via two spaced-apart contact surfaces, which has a positive effect on the positioning accuracy. It is especially advantageous if the sides of the two web regions are designed to be convex or beveled. This produces line contact with the walls 17, 18 of the groove 14, as a result of which the positioning accuracy is less affected by contamination.

If the cutting element 1 is produced as a sintered part, it is possible for only its underside 13 to be ground flat in order to reduce the production costs. In order to minimize differences in weight, it is advantageous to also additionally grind the top side 19 to a defined thickness relative to the underside 13. All the remaining positioning areas can retain an unmachined sintered surface.

Owing to the fact that, according to the invention, the distance between the two lateral bearing surfaces is reduced, because the cutting element 1 is positioned laterally via the groove 14, the positioning accuracy is increased. The distance between the groove walls 17, 18 in the cutting element 1 is approximately only ⅕ to ⅙ the distance from the right-hand to the left hand outer wall. Accordingly, the dimensional errors are also reduced to ⅕ to ⅙ compared with the dimensional errors of the outer walls, and so the accuracy after the sintering is sufficient and no additional grinding of the groove has to be carried out. For the shaping by pressing, it is advantageous if the groove flanks are inclined by 5 to 10 degrees. In this way, the pressed part can be removed from the mold more easily and is less susceptible to cracks during the sintering.

The cutting edges (blades 11) of the cutting elements 1 can be finish-machined in the fitted state in the supporting body 3. This is effected either by electrical discharge machining (for example in the case of polycrystalline diamond) or by grinding (e.g. in the case of carbide). The highest possible true-running accuracy of the blades 11 is achieved by sharpening in the supporting body 3. In the routing tool according to the invention, the accuracy of cutting elements 1 and recesses 2 in the supporting body 3 is so high that the blades 11 of the cutting elements 1 can be finish-machined (sharpened) as an individual part outside the supporting body. To this end, the cutting elements 1 are clamped in a device (not shown) corresponding to the recess 2 and are sharpened therein. Possible dimensional deviations during the positioning of the blade 11 perpendicularly with respect to the cutting edge (e.g. due to brazing errors or sintering tolerances) are recognized and corrected by probing the blade with the sharpening machine. For the lateral positioning, the accuracy of the groove 14 is so high that it does not matter whether the cutting element 1 is fixed in the recess 2 of the supporting body 3 on the right or left as this has no effect on the routing pattern which is produced with the finished tool. As a result, the entire tool can be provided with a single blade type.

In this way, an interchangeable system is achieved in which worn or damaged blades can be exchanged without the tool having to be sent to a service center. The supporting body 3 can always remain at the user's. Only the cutting elements 1 have to be sent away and resharpened. It is not necessary to keep replacement tools in stock. Only replacement blades have to be kept in stock.

Figure 9:
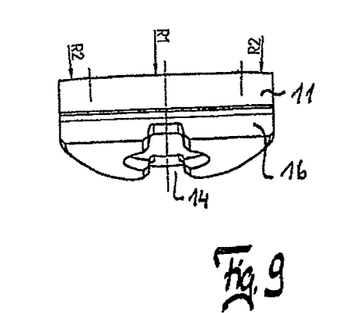
FIG. 9 shows the blade profile of a cutting element.

In tools whose overall cutting width is greater than the cutting width of a cutting element 1, the cutting elements 1 are arranged in the supporting body in such a way that the routing marks thereof on the workpiece are lined up laterally next to each other and overlap slightly, such that a flat surface is achieved on the workpiece. In certain applications, it is advantageous if a concave surface within the one hundredths of a millimeter range is produced on the workpiece, for instance in order to ensure that a tightly closing glued joint is achieved when gluing an edge strip to a narrow surface of a plate-like component. For such joining tools, too, which are intended to produce a defined cavity cut of a few hundredths of a millimeter on the workpiece, only one cutting tip type is provided. The convex blade profile of the complete tool is achieved by the recesses 4 in the supporting body 3 being arranged in their position in such a way that the envelope curve of the adjacent blades 11 produce the required cavity cut. In order to rout a flat surface at a given shear cut angle, the cutting edge 11 must have a slightly convex profile with a very large radius $R_1$. In order to avoid sharp-edged outlines caused by adjacent blades on the workpiece surface, the blade profile in the overlap region runs out with a smaller radius $R_2$ (cf. FIG. 9).

Figure 8:
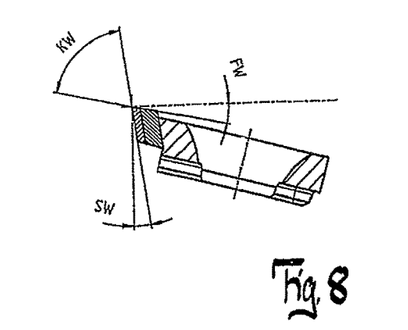
FIG. 8 shows the blade geometry of a cutting element.

So that the cutting element 1 in the corresponding recess 2 of the supporting body 3 terminates as far as possible flush with the outer surface (lateral surface 31) of the supporting body 3, it must be fitted as tangentially as possible. To this end, the cutting element 1 has a sloping region on the side of the blade 11, said sloping region being arranged in such a way that it forms the cutting edge itself or that a blade (e.g. of polycrystalline diamond) is brazed in place on it. The angle of the sloping region relative to the seating surface of the cutting element 1 corresponds substantially to the effective cutting angle SW in the fitted state (cf. FIG. 8). When fitting the cutting element 1 into the supporting body 3 at a shear cut angle, the effective cutting angle SW changes in such a way that it increases toward the trailing blade. The flank can in principle be produced according to two systems: either with a constant clearance angle FW or with a constant wedge angle KW. The embodiment with constant clearance angle FW produces constant frictional conditions over the entire cutting width, but leads to "right-hand" and "left-hand" blades, depending on the position of the shear cut angle. A preferred embodiment is therefore a cutting element 1 having a constant wedge angle KW. This has the advantage that only one type of cutting element 1 can be used, irrespective of the shear cut angle, which assumes, however, that the clearance angle FW in the region of the trailing blade does not become so small that the blade rubs excessively and as a result becomes resinous or burns.

Figure 10:
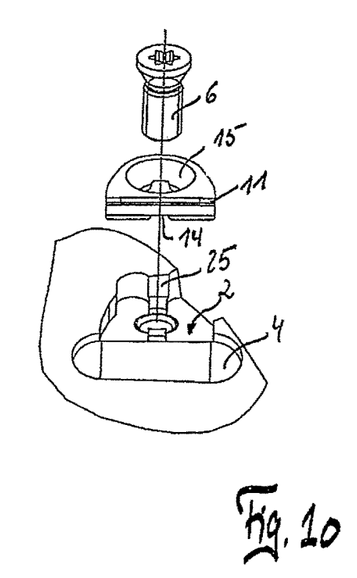
FIG. 10 shows the exploded illustration of the cutting element and of the receptacle in the supporting body of a first embodiment.

When fitting a cutting element 1 at a shear cut angle, the cutting forces acting on the blade 11 are split into various components. A normal force acts perpendicularly to the cutting edge. In the direction of the cutting edge, a passive force is produced by friction. In addition, since the application point of the cutting force is laterally offset from the center of the screw 6, a torque is produced about the fastening point. From the production point of view, therefore, an embodiment of the recess 2 in the supporting body 3 according to FIG. 10 is preferred. In this embodiment, the bearing surfaces for positioning the cutting element 1 are perpendicular to one another, as a result of which the accuracy to size is simpler to verify. The support of the cutting element 1 against the torque is effected in this embodiment solely by the frictional forces of the screw clamping. This embodiment is sufficient for most applications.

Figure 11:
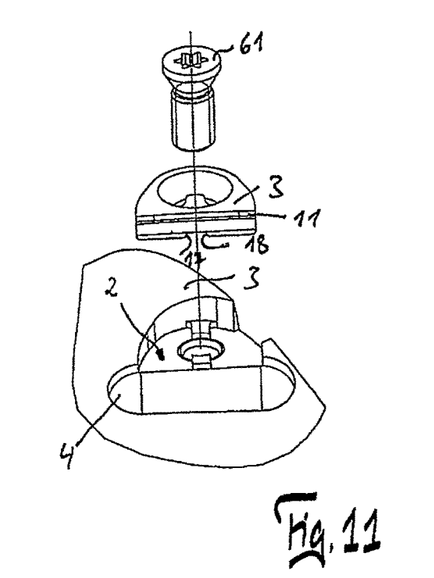
FIG. 11 shows the exploded illustration of the cutting element and of the receptacle in the supporting body of a second embodiment.
Figure 12:
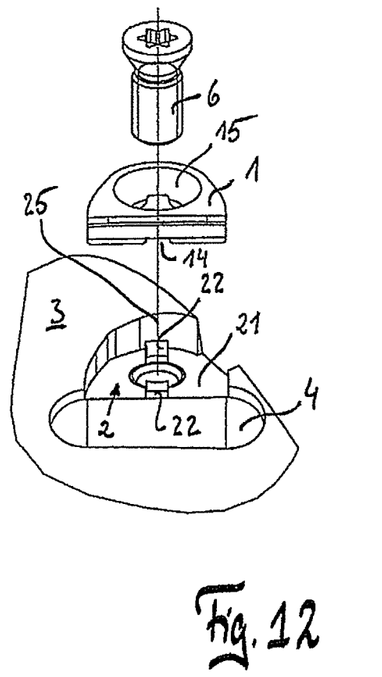
FIG. 12 shows the exploded illustration of the cutting element and of the receptacle in the supporting body of a third embodiment.

Better support against torques is achieved by the embodiment according to FIG. 11, in which the bearing surfaces for positioning the cutting element 1 are at an acute angle to one another.

If the cutting element 1 is to be positioned as close to the edge of the supporting body 3 as possible, an embodiment according to FIG. 12 is advantageous, in which the rear bearing surface is arranged so as to "lie on the inside" and thus the supporting body 3 is not needlessly widened. The tapped hole 23 is in this case the lateral boundary of the supporting body 3. Here, too, the torque is absorbed via frictional forces.

Figure 13:
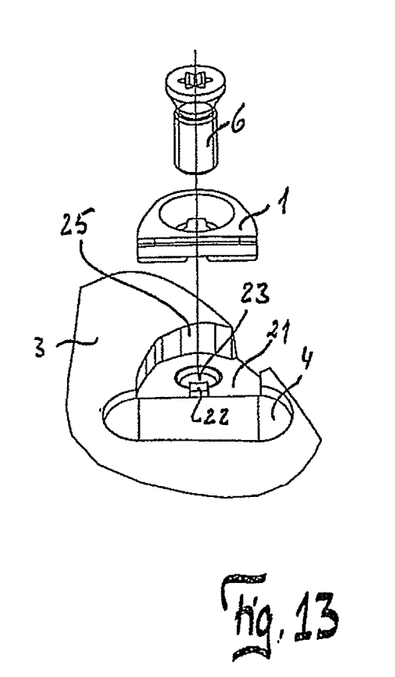
FIG. 13 shows the exploded illustration of the cutting element and of the receptacle in the supporting body of a fourth embodiment.

An embodiment of the recess 2 in the supporting body 3 according to FIG. 13 is especially advantageous against high torques which act on the cutting element 1 and may lead to twisting, in which embodiment the rear stop is designed to be prismatic as a centering means and the web 22 in the recess 2 serves as torque support only at the front at the blade 11.

Figure 14:
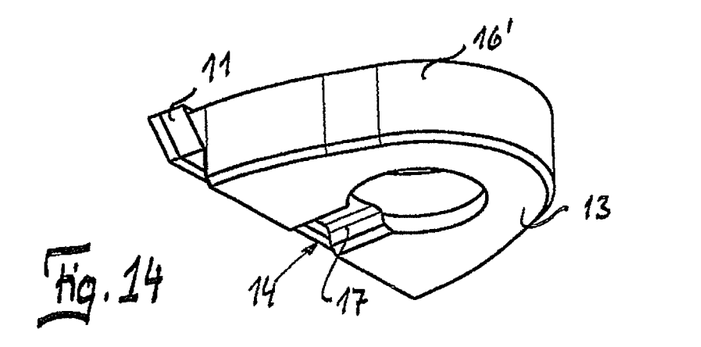
FIG. 14 shows the perspective illustration of a further cutting element according to the invention.

FIG. 14 shows an embodiment of the cutting element 1 which can be inserted into the recess 2 according to FIG. 13. Here, it is not necessary for the groove 14 to extend over the full length of the underside 13.

The invention claimed is:
1. A routing tool for machining nonmetallic materials, in particular wood, wood-based material and plastic, comprising a supporting body and a plurality of cutting elements which can be inserted therein circumferentially into a corresponding number of radially extending recesses and which can be screwed to the supporting body via a hole, the cutting element of the plurality of cutting elements comprising:
   a) plate-like design and of substantially triangular design with a blade at a side edge;
   b) a region opposite the blade that is rounded,
   c) a groove running substantially at right angles to the blade is provided in an underside,
   d) a hole divides the groove into two regions,
   and each recess comprises:
   e) a web which extends radially upward from a base thereof, serving as seating surface for the cutting element, and corresponds to the groove, and
   f) a radial tapped hole which separates the web into two regions,
   wherein
   g) the cutting element is in contact with the recess only with the underside thereof, a side wall of the groove and part of the rounded region thereof opposite the blade,
      wherein the recess has a circumferential wall whereby a portion of the circumferential wall is designed to have a flat area such that the rounded region of the cutting element makes contact with the recess at the flat area.
2. The routing tool as claimed in claim 1, wherein the cutting element is in mirror symmetry with respect to a longitudinal axis of the groove.
3. The routing tool as claimed in claim 1, wherein the groove extends over a full length of the underside.
4. The routing tool as claimed in claim 1, wherein the supporting body is made of light alloy.
5. The routing tool as claimed in claim 4, wherein the supporting body is aluminum.
6. The routing tool as claimed in claim 1, wherein the tapped hole in the recess is arranged slightly eccentrically.
7. The routing tool as claimed in claim 6, wherein the eccentricity is within the range of 0.02 to 0.2 mm.
8. The routing tool as claimed in claim 1, wherein at least the blade in an edge region of the supporting body is inserted into the supporting body at a shear cut angle for producing pressure forces on a workpiece.

9. The routing tool as claimed in claim 1, wherein the cutting element terminates substantially flush with a lateral surface of the supporting body.

10. The routing tool as claimed in claim 1, wherein the plurality of cutting elements are arranged in such a way that, during a rotation of the supporting body, they produce a convex envelope curve from which a concave surface in the machined workpiece results.

11. The routing tool as claimed in claim 1, wherein one chip space each is provided in front of each cutting element as viewed in a direction of rotation.

12. The routing tool as claimed in claim 1, wherein the underside includes a stepped portion which forms an underside of the blade, and which is extending from the groove.

13. The routing tool as claimed in claim 1, wherein the underside on opposing sides of the groove comprise a flat surface, which extends to a circumferential wall of the cutting element.

14. A cutting element for a routing tool for machining nonmetallic materials, the cutting element is of substantially triangular design comprising a plate-like body, a cutting edge provided on the body, which cutting edge is at a distance from an underside of the plate-like body and a fastening hole wherein:
   a) a region opposite the cutting edge is rounded,
   b) a groove running substantially at right angles to the cutting edge is incorporated into the underside,
   c) a longitudinal axis of the groove coincides with a line of symmetry, and
   d) the cutting edge is convexly curved and a radius of curvature ($R_2$) decreases at opposite edge regions,
      wherein the underside on opposing sides of the groove comprise a flat surface, which extends to a circumferential wall of the cutting element, and
      wherein a bevel provides a transition between the flat surface on the underside and the circumferential wall of the cutting element.

15. A routing tool for machining nonmetallic materials, in particular wood, wood-based material and plastic, comprising a supporting body and a plurality of cutting elements which can be inserted therein circumferentially into a corresponding number of radially extending recesses which can be screwed to the supporting body via a hole, the cutting element of the plurality of cutting elements comprising:
   a) plate-like design and of substantially triangular design with a blade at a side edge;
   b) a region opposite the blade that is rounded,
   c) a groove running substantially at right angles to the blade is provided in an underside,
   d) a hole divides the groove into two regions,
   and each recess comprises:
   e) a web which extends radially upward from a base thereof, serving as seating surface for the cutting element, and corresponds to the groove, and
   f) a radial tapped hole which separates the web into two regions,
   wherein
   g) the cutting element is in contact with the recess only with the underside thereof, a side wall of the groove and part of the rounded region opposite the blade, and
      wherein the cutting element has, at its rounded region, only one region is in contact with a circumferential wall of the recess.

16. The routing tool as claimed in claim 15, wherein the contact of the rounded region of the cutting element with the recess at the region thereof opposite the blade is linear.

17. The routing tool as claimed in claim 16, wherein the rounded region of the recess in the contact region is plane or flat.

18. A routing tool for machining nonmetallic materials, in particular wood, wood-based material and plastic, comprising a supporting body and a plurality of cutting elements which can be inserted therein circumferentially into a corresponding number of radially extending recesses which can be screwed to the supporting body via a hole, the cutting element of the plurality of cutting elements comprising:
   a) plate-like design and of substantially triangular design with a blade at a side edge;
   b) a region opposite the blade that is rounded,
   c) a groove running substantially at right angles to the blade is provided in an underside,
   d) a hole divides the groove into two regions,
   and each recess comprises:
   e) a web which extends radially upward from a base thereof, serving as seating surface for the cutting element, and corresponds to the groove, and
   f) a radial tapped hole which preferably separates the web into two regions,
   wherein
   g) the cutting element is in contact with the recess only with the underside thereof, a side wall of the groove and part of the rounded region thereof opposite the blade,
      wherein the underside on opposing sides of the groove comprise a flat surface, which extends to a circumferential wall of the cutting element, and
      wherein a bevel provides a transition between the flat surface on the underside and the circumferential wall of the cutting element.

19. The routing tool as claimed in claim 18, wherein only one side wall of the groove has contact in the base body with no contact with the flat surface.

20. The routing tool as claimed in claim 19, wherein the cutting elements, which are inserted therein in the recess are screwed to the supporting body by screws which are in direct contact with the cutting elements.

21. A routing tool for machining nonmetallic materials, in particular wood, wood-based material and plastic, comprising a supporting body and a plurality of cutting elements which can be inserted therein circumferentially into a corresponding number of axially open recesses and which can be screwed to the supporting body via a hole, the cutting element of the plurality of cutting elements comprising:
   a) plate-like design and of substantially triangular design with a blade at a side edge;
   b) a region opposite the blade that is rounded,
   c) a groove running substantially at right angles to the blade is provided in an underside,
   d) a hole divides the groove into two regions,
   and each recess comprises:
   e) a web which extends radially upward from a base thereof, serving as seating surface for the cutting element, and corresponds to the groove, and
   f) a radial tapped hole which separates the web into two regions,
   wherein
   g) the cutting element is in contact with the recess only with the underside thereof, a side wall of the groove and part of the rounded region thereof opposite the blade,
      wherein the recess has a circumferential wall whereby a portion of the circumferential wall is designed to have a flat area such that the rounded region of the cutting element makes contact with the recess at the flat area.

* * * * *